3,419,450
PROCESS FOR BONDING RUBBER TO
SHAPED POLYESTER STRUCTURES
Henry R. Krysiak, Wilmington, Del., assignor to E. I. du Pont de Nemours and Company, Wilmington, Del., a corporation of Delaware
No Drawing. Filed Nov. 6, 1964, Ser. No. 409,580
9 Claims. (Cl. 156—330)

ABSTRACT OF THE DISCLOSURE

The process for bonding rubber to shaped structures of polyesters which comprises coating the structure with an aqueous medium containing a specific epoxylated novolak resin, a rubber latex, and a resorcinol-formaldehyde resin; heating the coated structure; and then applying and curing a layer of rubber on the coated structure.

---

This invention relates to the treatment of fibrous material to improve its adhesion to rubber. More particularly it relates to a novel adhesive composition and method of application particularly suitable for synthetic linear condensation polyester fibers.

In contrast to the naturally occurring polymer fibers such as cotton and the older synthetic fibers such as nylon, the new polyester fibers have been found particularly difficult to bond to rubber. The outstanding properties of polyethylene terephthalate fibers and their commercial availability have made it highly desirable that good polyester-to-rubber adhesives be developed.

A one-step adhesive is preferred over a multi-step system in the trade because of labor, time and material savings. A large number of the rubber companies and converters are not equipped to dip consecutively in two or more steps, and the tire fabric has to be wound up and repassed through the dipping unit for the second step in the case of two-phase adhesives. This repassing of the tire fabric results in fabric wastage and increases the likelihood of fabric tearing. A number of one-step adhesives have been proposed, but none of these has been found fully satisfactory from the point of view of both performance and cost.

The present invention provides a novel adhesive capable of bonding synthetic polyester materials to rubber with good bond strength both at low and high temperatures. Furthermore, it may be prepared from low cost ingredients and applied to polyester structures in a single application step, thereby offering a considerable cost advantage over previously proposed adhesive systems. The adhesive is applied from an aqueous based medium, thereby eliminating health and fire hazards associated with the use of organic solvents.

In accordance with the present invention, shaped polymeric structures are bonded to rubber by a process comprising:

(1) Coating the structure with an aqueous medium containing from about 10% by weight to about 40% by weight of dispersed solids of:

(a) An epoxylated novolak resin preferably having an average of at least 2 epoxy groups in each molecule, an average molecular weight above about 540 and an epoxide equivalent in the range 200 to 300;

(b) A rubber, preferably a synthetic vinyl pyridine copolymer latex, the weight ratio of (b):(c) being within the range from 1:3 to 1:6, and with the sum of (b) and (c) constituting about 60% to about 85% by weight of the total solids dispersed in the aqueous medium; and (c) A resorcinol-formaldehyde resin in which the mole ratio of resorcinol to formaldehyde is between about 1:1.02 and 1.5:1;

(2) Heating the coated structure at a temperature above 215° C. and below the melting point of the polyester structure to dry and at least partially cure the coating, and (3) Applying and curing a layer of rubber on the coated structure.

The resorcinol-formaldehyde resin (b) should be prepared in the absence of added caustic, and the final adhesive mixture should not contain excess caustic. This composition, when applied and processed as described below, provides a final shaped structure bearing a coating of the reaction product of (a), (b), and (c) constituting from about 1% to about 20% by weight of the coated structure. The composition of the present invention is applied to the polymeric shaped structure by any conventional means such as dipping, spraying, or brushing, padding, or the like with the structure relaxed or under tension. After coating with the aqueous mixture described above, the wetted shaped structure is heated at a temperature above about 215° C. but below the melting point of the polymer making up the shaped structure, preferably at 215° to 235° C. for a period of about 1 to 5 minutes, to remove the water and to cure the coating. Particularly where the shaped structure is fibrous in nature, it is preferred that the structure be subjected to at least sufficient tension to prevent excessive shrinkage during the wetting and subsequent curing operations. After drying and curing the adhesive coating, the rubber is applied and cured in conventional fashion to produce a reinforced rubber shaped structure.

The adhesive is suitable for use not only with fibers, yarn and cord, but also with film, sheets, woven and nonwoven fabric and molded structures.

The term "epoxylated novolak resin" is intended to refer to the reaction product obtained by treating a non-heat-hardenable phenol-formaldehyde condensation product with epichlorohydrin. Epoxylated novolak resins and methods for their preparation are described in British Patent No. 746,824. They are also described by Lee and Neville in "Epoxy Resins" (McGraw-Hill, New York, 1957), page 18. An idealized structural formula for an epoxylated novolak particularly suitable for the present invention is:

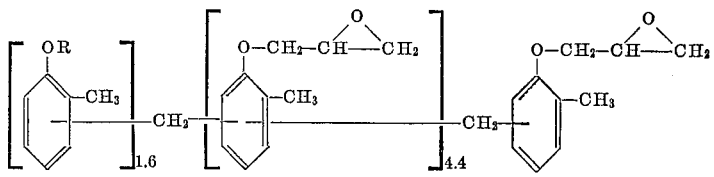

where R may be a chlorohydrin, glycol, or polymeric ether radical. Best results are obtained with an average molecular weight of 1100 to 1500, an oxirane oxygen content of 5% to 10% by weight, and an epoxide equivalent of 210 to 260.

It is preferred that the epoxylated novolak resin constitute about 15 to 40% of the total solids in the adhesive mixture, and be present in the final mixture, as applied, at a concentration in the range 1.5 to 16% by weight, based on total weight of the mixture. In preparing the adhesive mixture of this invention, the epoxylated novolak is dispersed in water along with a rubber and a phenol-aldehyde condensate. Preferably, the phenol-aldehyde condensate is a resorcinol-formaldehyde resin in which the mole ratio of resorcinol to formaldehyde is within the range of 1:1.02 to 1.5:1. Best results are obtained if the resorcinol-formaldehyde resin is prepared in the absence of added caustic or amines. Equivalent results are obtained with resorcinol-aldehyde resin prepared from acetaldehyde, and good results are also obtained when the aldehyde is furfural. Better adhesion results are obtained with these resorcinol-aldehyde condensates than when resorcinol is replaced with phenol, pyrogallol, hydroquinone, 2-methyl resorcinol or p-tert-butyl phenol.

The rubber component of the mixture is preferably a synthetic latex prepared in part from vinyl pyridine. Excellent results have been achieved by using commercially available butadiene/styrene/vinyl pyridine copolymer latexes in which the three components are present in the mole ratio 70/15/15. In the final adhesive mixture, it is preferred that the ratio of latex solids to phenol-aldehyde resin solids fall in the range 3:1 to 6:1, and that the combined weight of phenol-aldehyde-latex solids be present in the concentration range of 6% to 34% by weight based on the total weight of the mixture.

In the examples, illustrating the manner in which the invention may be carried out and the advantages obtained, the strength of the adhesive is determined by the "single-end strip adhesion test" (SESA), or the "H-pull" test.

In preparing samples for the single-end strip adhesion test, lengths of treated cord are placed in the bottom of a steel mold, the cords being parallel with a spacing of 1 inch between cords. The cords are placed under dead-weight tension to maintain their position. A sheet of unvulcanized compounded elastomer stock, 125 mils in thickness, is placed over the cords, covered with a cotton duck reinforcing backing, and the top plate of the mold placed over the backing. The mold is put into a platen press. A pressure of approximately 150 pounds per square inch is applied and the mold is usually heated to about 150° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1 inch wide strips, each having a cord in the center of its width. The cord end is separated from one end of the strip the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet.

The "H-pull" test is the well-known test described, for example, in India Rubber World, 114, 213–219 (May 1946), "Study of the 'H' Test for Evaluating the Adhesive Properties of Tire Cord in Natural and GR–S Rubber." Briefly, a dipped cord is cured across the center of two small rectangles of rubber with a short length of the cord exposed between the rubber pieces forming the crossbar of the H. The pieces of rubber are gripped in an Instron Tensile Testing machine and stress is applied so that the cord is pulled out from one of the pieces of rubber. The load required is regarded as a measure of the adhesion. In the examples of the present specification, the width of the rubber pieces is ¼ inch.

The rubber stock used for adhesion tests in the examples has the following composition:

| | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

The following examples illustrate specific embodiments of the invention. They are not intended to limit it in any manner. All parts and percentages are by weight, unless otherwise indicated.

EXAMPLE I

An adhesive mixture is prepared by combining the following two components:

The RFL component is prepared by dissolving 660 parts of resorcinol in 1320 parts of water and adding 440 parts of 37% by weight formaldehyde. This solution is stirred and then added to 9000 parts of a 41% solids butadiene/styrene/vinyl pyridine (70/15/15) copolymer latex. This RFL component is allowed to age a minimum of 4 days at 75° F. before using.

To a ball mill, which is half-filled with grinding media, is added 900 parts of an epoxylated novolak resin having a softening point of 99° C., an average molecular weight of 1270, an oxirane oxygen content of 6.6–7.0% by weight and an epoxide equivalent of 235. A solution of 30 parts by weight of dioctylsodiumsulfosuccinate in 2070 parts of water is added to the ball mill and the mixture is ground for 36 hours to form a slurry.

The two components are combined to form an adhesive mixture by adding 200 parts by weight of the 30% epoxy novolak slurry to 400 parts of the RFL component and diluting with 150 parts of water. The final mixture contains 29.4% by weight solids.

Polyethylene terephthalate tire cord having an 840 denier/two-ply (94 tex/two-ply) construction is dipped in the above-prepared adhesive mixture on a conventional single-end dipping machine and then heated at 224° C. for two minutes while undergoing a 5% stretch. The total adhesive solids on the cord, as measured by weight increase, is found to be from 7% to 9%. The cords are tested for adhesion to rubber, using the previously described tests, with the results shown in Table 1.

Table 1

| Test: | Results, lbs. |
|---|---|
| SESA, ° C.: | |
| 24 | 4.3 |
| 140 | 3.6 |
| H-Pull, ° C.: | |
| 24 | 25 |
| 140 | 19 |

The cord is also tested for adhesion to a different rubber stock which is a 50–50 blend of natural and styrene-butadiene rubber containing HAF black and a sulfenamide accelerator (Stock BB). In the single-end strip adhesion test at 24° C. a value of 3 pounds adhesion is obtained.

EXAMPLE II

For comparison, a cord similar to that used in Example I is dipped in the RFL component only, with no epoxylated novolak resin present. All other conditions are the same as used in Example I. In the SESA test, both at 24° C. and at 140° C., values less than 1.5 pounds are obtained.

EXAMPLE III

The general procedure of Example I is repeated with the exception that the mole ratio of resorcinol to formaldehyde in the RFL component is varied. All other conditions are the same as in Example I. The samples produced are tested for adhesion in the single-end strip adhesion test with the results shown in Table 2.

Table 2

| Mole ratio resorcinol/formaldehyde: | SESA, lbs. (24° C.) |
|---|---|
| 1/1 | 4.3 |
| 1.11/1 | 4.1 |
| 1.2/1 | 4.0 |
| 1.4/1 | 3.1 |

To illustrate the criticality of the mole ratio of resorcinol to formaldehyde, the experiment is repeated using a mole rtio of 0.77/1. When the sample is tested for adhesion in the SESA test at 24° C., a value less than 1 pound is obtained.

EXAMPLE IV

This example illustrates several suitable variations in the adhesive composition of Example I. The general procedure of Example I is repeated with the exception that the amounts of the various components are changed as indicated in Table 3. The adhesive-treated cord samples are heated after dipping at 224° C. for 1 minute under 2% applied stretch, and are tested for adhesion with the results shown in Table 3. A good level of adhesion is obtained with all samples.

TABLE 3

| Sample | Dip Composition | | | | | SESA, lbs., 24° C./140° C. | H-pulls,lbs., 24° C./140° C. |
|---|---|---|---|---|---|---|---|
| | Percent epoxylated Novolak | Percent RFL solids | RFL composition | | | | |
| | | | Molar ratio, resorc./CH$_2$O | Latex/resin, wt. ratio | Novolak/RFL, resin ratio | | |
| IV A | 6.6 | 21 | 1.21/1 | 3.26/1 | 0.23 | 4.0/3.4 | 25/20 |
| IV B | 6.6 | 21 | 1.21/1 | 5.45/1 | 0.23 | 3.9/2.0 | 21/17 |
| IV C | 6.6 | 21 | 1.11/1 | 3.22/1 | 0.23 | 3.7/3.6 | 25/19 |
| IV D | 6.6 | 21 | 1.11/1 | 5.37/1 | 0.23 | 4.1/2.5 | 24/17 |
| IV E | 8.4 | 18 | 1/1 | 5.25/1 | 0.22 | 4.3/3.1 | 23/19 |

EXAMPLE V

This example illustrates the use of aldehydes other than formaldehyde in the preparation of the RFL component of the adhesive of this invention. Following the general procedure of Example I a resorcinol solution is mixed with aldehyde to give a 1/1 mole ratio of resorcinol to aldehyde, and then added to a vinyl pyridine/styrene/butadiene latex in sufficient quantity to give a resorcinol-aldehyde-resin to latex solids ratio of about 0.23/1. Total solids in the mixture are about 27% by weight. After aging for about 4 days, this mixture is added to an aqueous dispersion of the epoxylated novolak of Example I to give a final adhesion mixture containing about 7.5% epoxylated novolak and about 18% resorcinol-aldehyde-latex solids. Polyethylene terephthalate cords of 840 denier/two-ply (94 tex/two-ply) construction are dipped in the adhesive mixture and then heated in air at 224° C. for 1 minute under 2% applied stretch. The cord samples are tested for adhesion in the single-end strip adhesion test at 24° C. with the results shown in Table 4.

Table 4

| Aldehyde component of mixture: | SESA, lbs. (24° C.) |
|---|---|
| Acetaldehyde | 4.1 |
| Furfural | 3.4 |

EXAMPLE VI

This example illustrates the use of the adhesive of this invention in the preparation of a pneumatic tire.

A stock slurry is prepared by ball-milling for 48 hours a mixture of epoxylated novolak resin and wetting agent in water, as indicated in the table below.

Stock slurry 900 parts by weight powdered epoxylated novolak resin (as Example I)
40 parts dioctyl sodium sulfosuccinate (75% active ingredient)
2,060 parts water An RFL mixture having the composition indicated below is prepared and allowed to age 4 days before using.

RFL Mixture 660 parts by weight resorcinol
440 parts of 37% formaldehyde solution
1,320 parts water
9,000 parts of a 41% solids butadiene/styrene/vinyl pyridine (70/15/15) copolymer latex An adhesive dip is prepared by mixing 4 parts of the stock slurry with 8 parts of the RFL mixture and 3 parts water. Polyethylene terephthalate tire cord having an 840 denier/two-ply (94 tex/two-ply) construction is passed in continuous fashion through the dip and then through an oven where it is heated at 218° C. for 2 minutes while undergoing a stretch of 5%. This cord is coded Dip VI A.

For comparison purposes a second cord sample (coded Dip VI B) is prepared using an adhesive described in French Patent No. 1,340,352 which requires applying a subcoat containing phenol-blocked methylene-bis-4-phenylisocyanate and an epoxy resin ("Epon" 812, Shell Chemical Co.), curing and then over-coating with a resorcinol-formaldehyde-vinyl pyridine latex (RFL) adhesive. The subcoating is applied to the tire cord and dried at 218° C. for 1 minute with 5% applied stretch, and then the RFL topcoat is applied and dried at 210° C. for 1 minute with 0% applied stretch. This adhesive is considered one of the best of the previously known polyester-to-rubber adhesives but requires the use of an expensive isocyanate ingredient, as well as the use of a two-step application process.

The two adhesive-coated cords are used to prepare several 4-ply 8.50–14 automobile tires utilizing standard tire construction techniques. Rubber stock BB (Example I) is used as the skim-rubber coat next to the cord. The completed tires are subjected to an accelerated high-speed indoor endurance test in which each tire is run against a steel wheel under a load of 1205 lbs. at an ambient temperature of 100° F. (38° C.) with the tires inflated to 22 pounds per square inch. The tires are brought to temperature, run at 60 m.p.h. for the first two hours, then 75 m.p.h. for 1 hour, and then the speed raised 5 m.p.h. each hour thereafter until failure occurs. The speed reached before failure and the miles traveled at the failure speed in an actual experimental test are given in the table below. It is noted that the tires prepared with the adhesive of this invention are at least as good as the tires prepared with the more expensive control adhesive. Performance of both adhesives was considered excellent in this test. None of the tires lost air at failure.

TABLE 5

| Tire identification | Test results | |
|---|---|---|
| | Failure speed, m.p.h. | Miles at Failure, speed |
| Dip VI A: | | |
| Tire No. 1 | 100 | 38 |
| Tire No. 2 | 100 | 46 |
| Dip VI B: | | |
| Tire No. 1 | 100 | 60 |
| Tire No. 2 | 100 | 28 |

The present invention provides an adhesive capable of bonding polyester articles to rubber with good bond strength. Furthermore, the adhesive may be prepared from low-cost ingredients, and is applied to the polyester article in a single coating step, thereby providing greater efficiency of operation than known adhesive systems requiring a two-step application. The invention is directed particularly to polyester fibers since known adhesives for polyester fibers have been inadequate in many respects. However, the process of the invention is not limited to the treating of polyester fibers and the adhesive described may be applied to any fibrous material useful in reinforcing rubber products, such as cotton, rayon, nylon, and the like.

Compositions produced according to the invention may be utilized for a wide variety of important industrial applications. They may be used, for example, in the preparation of pneumatic tires for automobiles, buses, tractors, and aircraft, in transmission belts, conveyor belts, floor tiles, hoses, raincoats, luggage, tarpaulins, and the like.

Since many different embodiments of the invention may be made without departing from the spirit and scope thereof, it is to be understood that the invention is not limited by these specific illustrations except to the extent defined in the following claims.

I claim:

1. The process for bonding rubber to a shaped structure composed of a linear condensation polyester which comprises:
   (1) Coating the structure with an aqueous medium containing from about 10% by weight to about 40% by weight of dispersed solids of:
      (a) An epoxylated novolak resin that is the reaction product of a non-heat-hardenable phenol-formaldehyde condensation product with epichlorohydrin having an average of at least 2 epoxy groups in each molecule, an average molecular weight above about 540 and an epoxide equivalent in the range 200 to 300;
      (b) A rubber, comprising a synthetic vinyl pyridine copolymer latex, the weight ratio of (b): (c) being within the range from 1:3 to 1:6, and with the sum of (b) and (c) constituting about 60% to about 85% by weight of the total solids dispersed in the aqueous medium; and
      (c) A resorcinol-formaldehyde resin in which the mole ratio of resorcinol to formaldehyde is between about 1:1.02 and 1.5:1;
   (2) Heating the coated structure at a temperature above 215° C. and below the melting point of the polyester structure to dry and at least partially cure the coating, and
   (3) Applying and curing a layer of rubber on the coated structure.

2. A process as defined in claim 1 wherein the epoxylated novolak resin has an average molecular weight of 1100 to 1500, an oxirane oxygen content of 5% to 10% by weight, and an epoxide equivalent of 210 to 260.

3. A process as defined in claim 1 wherein the aqueous medium contains 1.5% to 16% of the expoxylated novolak resin.

4. A process as defined in claim 1 wherein the aqueous medium contains a combined total of 6% to 34% of the resorcinol-formaldehyde resin and synthetic vinyl pyridine copolymer solids.

5. A process as defined in claim 1 wherein the vinyl pyridine copolymer is a butadiene/styrene/vinyl pyridine terpolymer in which the three components are present in the mole ratio 70/15/15.

6. A process as defined in claim 1 wherein the resorcinol-formaldehyde resin is free from added caustic and amines.

7. A process as defined in claim 1 wherein the aqueous medium containing components (a), (b) and (c) is applied to a fibrous structure in step (1) and heated in step (2) to provide a fibrous structure bearing a coating of the reaction product of (a), (b) and (c) constituting from about 1% to about 20% by weight of the coated structure.

8. A process as defined in claim 7 wherein the coated structure is heated in step (2) at 215° to 235° C. for 1 to 5 minutes to remove water and cure the coating.

9. A process as defined in claim 7 wherein the fibrous structure is maintained under sufficient tension to prevent shrinkage while applying and curing the coating.

References Cited

UNITED STATES PATENTS

| | | | |
|---|---|---|---|
| 2,902,398 | 9/1959 | Schroeder | 161—92 X |
| 2,903,381 | 9/1959 | Schroeder | 117—138.5 X |
| 2,917,422 | 12/1959 | Waller | 117—7 X |
| 3,036,948 | 5/1962 | Danielson | 161—252 X |
| 3,190,764 | 6/1965 | Cardina | 161—241 X |
| 3,222,238 | 12/1965 | Krysiak | 161—231 X |
| 3,231,412 | 1/1966 | Pruitt et al. | 161—253 X |
| 3,234,067 | 2/1966 | Krysiak | 156—330 |
| 3,247,043 | 4/1966 | Cardina | 161—184 X |
| 3,297,467 | 1/1967 | Macura et al. | 161—184 X |
| 3,308,007 | 3/1967 | Shepard | 161—241 X |

EARL M. BERGERT, *Primary Examiner.*

R. KILLWORTH, *Assistant Examiner.*

156—335; 161—184, 231; 117—138.8